(12) United States Patent
Steinke et al.

(10) Patent No.: US 8,937,135 B2
(45) Date of Patent: Jan. 20, 2015

(54) BIODEGRADABLE POLYMER MIXTURE

(75) Inventors: Tobias Heinz Steinke, Speyer (DE);
Hans-Helmut Görtz, Freinsheim (DE);
Jürgen Ahlers, Groß-Rohrheim (DE);
Freddy Gruber, Offenbach (DE);
Gabriel Skupin, Speyer (DE)

(73) Assignee: BASF SE (DE)

( * ) Notice: Subject to any disclaimer, the term of this patent is extended or adjusted under 35 U.S.C. 154(b) by 409 days.

(21) Appl. No.: 13/121,298

(22) PCT Filed: Sep. 21, 2009

(86) PCT No.: PCT/EP2009/062202
§ 371 (c)(1),
(2), (4) Date: Mar. 28, 2011

(87) PCT Pub. No.: WO2010/034689
PCT Pub. Date: Apr. 1, 2010

(65) Prior Publication Data
US 2011/0178196 A1    Jul. 21, 2011

(30) Foreign Application Priority Data

Sep. 29, 2008  (EP) .................................. 08165370
Dec. 4, 2008   (EP) .................................. 08170633

(51) Int. Cl.
*C08G 65/32* (2006.01)

(52) U.S. Cl.
USPC ............ 525/410; 521/138; 521/182; 525/411; 525/418; 525/419; 525/437; 525/445; 525/450; 528/272; 528/297; 528/302; 528/308; 528/370; 528/371

(58) Field of Classification Search
USPC ............... 528/272, 297, 370, 371, 302, 308; 525/445, 410, 411, 418, 419, 437, 450; 521/138, 182
See application file for complete search history.

(56) References Cited

U.S. PATENT DOCUMENTS

| | | | |
|---|---|---|---|
| 4,789,727 | A | 12/1988 | Sun |
| 5,817,721 | A | 10/1998 | Warzelhan et al. |
| 5,863,991 | A | 1/1999 | Warzelhan et al. |
| 5,880,220 | A | 3/1999 | Warzelhan et al. |
| 5,883,199 | A | 3/1999 | McCarthy et al. |
| 5,889,135 | A | 3/1999 | Warzelhan et al. |
| 5,936,045 | A | 8/1999 | Warzelhan et al. |
| 6,018,004 | A | 1/2000 | Warzelhan et al. |
| 6,046,248 | A | 4/2000 | Warzelhan et al. |
| 6,111,058 | A | 8/2000 | Warzelhan et al. |
| 6,114,042 | A | 9/2000 | Warzelhan et al. |
| 6,120,895 | A | 9/2000 | Kowitz et al. |
| 6,201,034 | B1 | 3/2001 | Warzelhan et al. |
| 6,258,924 | B1 | 7/2001 | Warzelhan et al. |
| 6,303,677 | B1 | 10/2001 | Warzelhan et al. |
| 6,353,084 | B1 | 3/2002 | Warzelhan et al. |
| 7,304,172 | B2 | 12/2007 | Coates et al. |
| 7,807,773 | B2* | 10/2010 | Matsuoka et al. ............ 528/272 |
| 2005/0137332 | A1* | 6/2005 | Hale et al. ........................ 525/66 |
| 2009/0157020 | A1* | 6/2009 | Shi et al. ........................ 604/359 |
| 2009/0234042 | A1* | 9/2009 | Luinstra ........................ 523/105 |

FOREIGN PATENT DOCUMENTS

| | | |
|---|---|---|
| DE | 102005053068 A1 | 5/2007 |
| EP | 539541 A1 | 5/1993 |
| EP | 575349 A1 | 12/1993 |
| EP | 652910 A1 | 5/1995 |
| EP | 792309 A1 | 9/1997 |
| EP | 1264860 A1 | 12/2002 |
| JP | 2005-146482 | 6/2005 |
| JP | 2005-146482 A | 6/2005 |
| JP | 2007-161837 A | 6/2007 |

(Continued)

OTHER PUBLICATIONS

U.S. Appl. No. 13/070,896, filed Mar. 24, 2011, Ren et al.

(Continued)

*Primary Examiner* — John Cooney
(74) *Attorney, Agent, or Firm* — Drinker Biddle & Reath LLP

(57) ABSTRACT

The present invention relates to biodegradable polymer mixtures comprising i) 40% to 95% by weight, based on the total weight of components i to ii, of at least one polyester based on aliphatic or aliphatic and aromatic dicarboxylic acids and aliphatic dihydroxy compounds;

ii) 5% to 60% by weight, based on the total weight of said components i to ii, of polyalkylene carbonate, particularly polypropylene carbonate;

iii) 0% to 60% by weight, based on the total weight of said components i to iii, of at least one biodegradable homo- or copolyester selected from the group consisting of polylactic acid, polycaprolactone and polyhydroxyalkanoate, and/or of an inorganic or organic filler;

iv) 0% to 10% by weight, based on the total weight of said components i to ii, of an epoxy-containing copolymer based on styrene, acrylic ester and/or methacrylic ester, and v) 0% to 15% by weight of an additive selected from the group consisting of lubricant, antiblocking agent, antistat, UV absorber, UV stabilizer, thermal stabilizer, dye, pigment, colorant, plasticizer, fertilizer and active crop protection ingredient.

The present invention further relates to processes for producing biodegradable polymer mixtures, to the use of biodegradable polymer mixtures in the production of moldings, films or fibers and also moldings, films or fibers comprising biodegradable polymer mixtures.

14 Claims, No Drawings

(56) References Cited

FOREIGN PATENT DOCUMENTS

| | | |
|---|---|---|
| JP | 2007-270076 | 10/2007 |
| JP | 2008-013602 | 1/2008 |
| WO | WO-92/09654 A2 | 6/1992 |
| WO | WO-96/15173 A1 | 5/1996 |
| WO | WO-96/15174 A1 | 5/1996 |
| WO | WO-96/15175 A1 | 5/1996 |
| WO | WO-96/15176 A1 | 5/1996 |
| WO | WO-96/21689 A2 | 7/1996 |
| WO | WO-96/21690 A1 | 7/1996 |
| WO | WO-96/21691 A1 | 7/1996 |
| WO | WO-96/21692 A1 | 7/1996 |
| WO | WO-96/25446 A1 | 8/1996 |
| WO | WO-96/25448 A1 | 8/1996 |
| WO | WO-98/12242 A1 | 3/1998 |
| WO | WO 2005/085346 * | 9/2005 |
| WO | WO-2006/097353 A1 | 9/2006 |
| WO | WO-2006/097354 A1 | 9/2006 |
| WO | WO 2007/125039 * | 11/2007 |
| WO | WO-2007/125039 A1 | 11/2007 |
| WO | WO 2010/034689 | 4/2010 |
| WO | WO 2010/034712 | 4/2010 |
| WO | WO 2011/054786 | 5/2011 |

OTHER PUBLICATIONS

U.S. Appl. No. 13/121,560, filed Mar. 20, 2011, Skupin et al.
U.S. Appl. No. 13/121,659, filed Mar. 28, 2011, Skupin et al.
U.S. Appl. No. 13/121,535, filed Mar. 29, 2011, Skupin et al.
U.S. Appl. No. 13/070,942, filed Mar. 24, 2011, Ren et al.
Luinstra & Borchardt, "Material Properties of Poly(Propylene Carbonates)," 245 *Adv. Polym. Sci.* 29-48 (2012).

* cited by examiner

BIODEGRADABLE POLYMER MIXTURE

CROSS-REFERENCE TO RELATED APPLICATIONS

This application is a national stage application (under 35 U.S.C. §371) of PCT/EP2009/062202, filed Sep. 21, 2009, which claims benefit of European applications 08165370.1, filed Sep. 29, 2008 and 08170633.5, filed Dec. 4, 2008.

BACKGROUND OF THE INVENTION

The present invention relates to biodegradable polymer mixtures comprising
i) 40% to 95% by weight, based on the total weight of components i to ii, of at least one polyester based on aliphatic or aliphatic and aromatic dicarboxylic acids and aliphatic dihydroxy compounds;
ii) 5% to 60% by weight, based on the total weight of said components i to ii, of polyalkylene carbonate, particularly polypropylene carbonate;
iii) 0% to 60% by weight, based on the total weight of said components i to iii, of at least one biodegradable homo- or copolyester selected from the group consisting of polylactic acid, polycaprolactone and polyhydroxyalkanoate, and/ or of an inorganic or organic filler;
iv) 0% to 10% by weight, based on the total weight of said components i to ii, of an epoxy-containing copolymer based on styrene, acrylic ester and/or methacrylic ester, and
v) 0% to 15% by weight of an additive selected from the group consisting of lubricant, antiblocking agent, antistat, UV absorber, UV stabilizer, thermal stabilizer, dye, pigment, colorant, plasticizer, fertilizer and active crop protection ingredient.

The present invention further relates to processes for producing biodegradable polymer mixtures, to the use of biodegradable polymer mixtures in the production of moldings, films or fibers and also moldings, films or fibers comprising biodegradable polymer mixtures.

Biodegradable mixtures comprising i) 20% to 5% by weight of a polyester based on aliphatic and aromatic dicarboxylic acids and aliphatic dihydroxy compound, ii) 20% to 80% by weight of polypropylene carbonate and iii) 60% to 15% by weight of polylactide are already known from WO 2007/125039. In these polymer mixtures, it is always the polypropylene carbonate, or the mixture of polypropylene carbonate and polylactic acid, which forms the continuous phase. Films comprising these mixtures are not always satisfactory with regard to their mechanical properties.

In practice, it is often difficult to achieve the desired combination of properties via mixtures. The properties of mixtures do not result additively from the properties of the individual components. Moreover, properties such as toughness and stiffness often trend in opposite directions. Furthermore, with some polymer mixtures, properties of individual components such as transparency and barrier effect are at least partly lost.

BRIEF SUMMARY OF THE INVENTION

It is an object of the present invention to provide biodegradable mixtures having good barrier properties and good mechanical properties such as high tensile strength and puncture resistance.

We have found that this object is achieved by the biodegradable polymer mixtures defined at the outset, which will be more particularly described in what follows. The polymer mixtures of the present invention differ from those of the prior art by including a higher proportion of component i, in particular. Preferably it is component i which forms the continuous phase in the polymer mixtures.

In principle, polyesters based on aliphatic and aromatic dicarboxylic acids and aliphatic dihydroxy compounds, known as partly aromatic polyesters, and aliphatic polyesters formed from aliphatic dicarboxylic acids and aliphatic diols are all useful as component for producing the biodegradable polyester mixtures of the present invention. These polyesters all share the feature that they are biodegradable to DIN EN 13432. It will be appreciated that mixtures of two or more such polyesters are also useful as component i.

DETAILED DESCRIPTION OF THE INVENTION

Partly aromatic polyesters (component i) shall for the purposes of the present invention also comprise polyester derivatives such as polyether esters, polyester amides or polyether ester amides. Useful partly aromatic polyesters include linear non-chain-extended polyesters (WO 92/09654). Preference is given to chain-extended and/or branched partly aromatic polyesters. The latter are known from the above-cited references WO 96/15173 to 15176, 21689 to 21692, 25446, 25448 or WO 98/12242, which are each expressly incorporated herein by reference. Mixtures of different partly aromatic polyesters are similarly useful. Interesting recent developments are based on renewable raw materials (see WO-A 2006/097353, WO-A 2006/097354 and EP 08165372.7). Partly aromatic polyesters are to be understood as meaning in particular products such as Ecoflex® (BASF SE) and Eastar® Bio, Origo-Bi® (Novamont).

Particularly preferred partly aromatic polyesters include polyesters comprising as essential components
A) an acid component composed of
  a1) 30 to 99 mol % of at least one aliphatic dicarboxylic acid or its/their ester-forming derivatives or mixtures thereof,
  a2) 1 to 70 mol % of at least one aromatic dicarboxylic acid or its/their ester-forming derivative or mixtures thereof, and
  a3) 0 to 5 mol % of a sulfonated compound,
B) a diol component composed of at least one $C_2$- to $C_{12}$-alkanediol or mixtures thereof
and, if desired, also one or more components selected from
C) a component selected from
  c1) at least one dihydroxy compound comprising ether functions and having the formula I

where n represents 2, 3 or 4 and m represents an integer from 2 to 250,
  c2) at least one hydroxy-carboxylic acid of the formula IIa or IIb

where p represents an integer from 1 to 1500 and r represents an integer from 1 to 4, and G represents a radical selected from the group consisting of phenylene, o-hydroxyphenylene, —(CH$_2$)$_q$—, where q is an integer from 1 to 5, —C(R)H— and —C(R)HCH$_2$, where R represents methyl or ethyl, c3) at least one amino-C$_2$- to C$_{12}$-alkanol or at least one amino-C$_5$- to C$_{10}$-cycloalkanol or mixtures thereof, c4) at least one diamino-C$_1$- to C$_8$-alkane, c5) at least one 2,2'-bisoxazoline of the general formula III

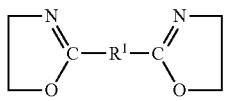
(III)

where R$^1$ represents a single bond, a (CH$_2$)$_z$ alkylene group, where z=2, 3 or 4, or a phenylene group, c6) at least one amino carboxylic acid selected from the group consisting of natural amino acids, polyamides obtainable by polycondensation of a dicarboxylic acid having 4 to 6 carbon atoms and a diamine having 4 to 10 carbon atoms, compounds of the formulae IV a and IVb

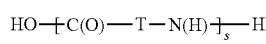
(IVa)

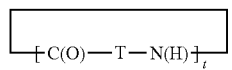
(IVb)

where s represents an integer from 1 to 1500 and t represents an integer from 1 to 4 and T represents a radical selected from the group consisting of phenylene, —(CH$_2$)$_u$—, where u represents an integer from 1 to 12, —C(R$^2$)H— and —C(R$^2$)HCH$_2$, where R$^2$ represents methyl or ethyl, and polyoxazolines comprising the repeat unit V

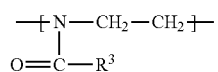
(V)

where R$^3$ represents hydrogen, C$_1$-C$_6$-alkyl, C$_5$-C$_8$-cycloalkyl, unsubstituted phenyl, phenyl substituted up to three times with C$_1$-C$_4$-alkyl groups or tetrahydrofuryl, or mixtures of c1) to c6)

and

D) a component selected from:
  d1) a compound having at least three groups capable of ester formation,
  d2) a di- or polyisocyanate,
  d3) a di- or polyepoxide
or mixtures of d1) to d3).

The acid component A of the partly aromatic polyesters in one preferred embodiment comprises from 30 to 70, in particular from 40 to 60 mol % of a1 and from 30 to 70, particularly from 40 to 60 mol % of a2.

As aliphatic acids and the corresponding derivatives a1 it is generally those with 2 to 18 carbon atoms, preferably 4 to 10 carbon atoms which are contemplated. They can be branched as well as linear. In principle, however, it is also possible to use dicarboxylic acids having a larger number of carbon atoms, for example up to 30 carbon atoms.

Suitable examples are oxalic acid, malonic acid, succinic acid, glutaric acid, 2-methylglutaric acid, 3-methylglutaric acid, α-ketoglutaric acid, adipic acid, pimelic acid, azelaic acid, sebacic acid, brassylic acid, fumaric acid, 2,2-dimethylglutaric acid, suberic acid, diglycolic acid, oxaloacetic acid, glutamic acid, aspartic acid, itaconic acid and maleic acid. The dicarboxylic acids or their ester-forming derivatives can be used individually or in the form of a mixture of two or more thereof.

Preference is given to using succinic acid, adipic acid, azelaic acid, sebacic acid, brassylic acid or their respective ester-forming derivatives or mixtures thereof. Particular preference is given to using succinic acid, adipic acid or sebacic acid or their respective ester-forming derivatives or mixtures thereof. Particular preference is given to using adipic acid or its ester-forming derivatives, such as its alkyl esters or their mixtures. Sebacic acid, or mixtures of sebacic acid with adipic acid, are preferably used as aliphatic dicarboxylic acid to produce polymer mixtures having "hard" or "brittle" components ii) such as for example polyhydroxybutyrate or particularly polylactide. Succinic acid or mixtures of succinic acid with adipic acid are preferably used as aliphatic dicarboxylic acid to produced polymer mixtures having "hard" or "tough" components ii) such as for example polyhydroxybutyrate-co-valerate.

Succinic acid, azelaic acid, sebacic acid and brassylic acid also have the advantage that they are available as renewable raw materials.

The aromatic dicarboxylic acids or their ester-forming derivatives a2 can be used individually or in the form of a mixture of two or more thereof. Particular preference is given to using terephthalic acid or its ester-forming derivatives such as dimethyl terephthalate.

In general, the diols B are selected from branched or linear alkanediols having 2 to 12 carbon atoms, preferably 4 to 6 carbon atoms, or cycloalkane diols having 5 to 10 carbon atoms.

Examples of useful alkanediols are ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-dimethyl-1,6-hexanediol, particularly ethylene glycol, 1,3-propanediol, 1,4-butanediol and 2,2-dimethyl-1,3-propanediol (neopentyl glycol); cyclopentanediol, 1,4-cyclohexanediol, 1,2-cyclohexanedimethanol, 1,3-cyclohexane-dimethanol, 1,4-cyclohexanedimethanol or 2,2,4,4-tetramethyl-1,3-cyclobutanediol. Particular preference is given to 1,4-butanediol, particularly combined with adipic acid as component a1) and 1,3-propanediol, particularly combined with sebacic acid as component a1). 1,3-Propanediol additionally has the advantage that it is available as a renewable raw material. Mixtures of different alkanediols can also be used.

Depending on whether an excess of acid or OH end groups is desired, either component A or component B can be used in excess. In a preferred embodiment, the A:B molar ratio of the components used can be in the range from 0.4:1 to 1.5:1 and preferably in the range from 0.6:1 to 1.1:1.

The preferred partly aromatic polyesters are characterized by a molecular weight (M$_n$) in the range from 1000 to 100 000, particularly in the range from 9000 to 75 000 g/mol and preferably in the range from 10 000 to 50 000 g/mol and a melting point in the range from 60 to 170° C. and preferably in the range from 80 to 150° C.

The partly aromatic polyesters mentioned may have hydroxyl and/or carboxyl end groups in any desired proportion. The partly aromatic polyesters mentioned can also be subjected to end group modification. For instance, OH end groups can be acid modified by reaction with phthalic acid, phthalic anhydride, trimellitic acid, trimellitic anhydride, pyromellitic acid or pyromellitic anhydride.

In addition to the components A and B, the polyesters on which the polyester mixtures of the present invention are based may comprise further components, such as the aforementioned components C and D.

Aliphatic polyesters (component i) comprise polyesters comprising units derived from aliphatic diols and aliphatic dicarboxylic acids such as polybutylene succinate (PBS), polybutylene succinate adipate (PBSA), polybutylene succinate sebacate (PBSSe), polybutylene sebacate (PBSe) or corresponding polyester amides. The aliphatic polyesters are marketed by Showa Highpolymers under the name of Bionolle and by Mitsubishi under the name of GSPIa. More recent developments are described in EP08165370.1.

Aliphatic polyesters (component i) further comprise cycloaliphatic polyesters particularly cellulose alkyl esters such as cellulose acetate, cellulose acetate butyrate or cellulose butyrate.

Polyalkylene carbonates (component ii) primarily comprise polyethylene carbonate (see EP-A 1264860), obtainable by copolymerization of ethylene oxide and carbon dioxide and particularly polypropylene carbonate (see for example WO 2007/125039 PPC), obtainable by copolymerization of propylene oxide and carbon dioxide.

The polyalkylene carbonate chain may comprise not only ether but also carbonate groups. The proportion of carbonate groups in the polymer depends on the reaction conditions such as particularly the catalyst used. In the preferred polyalkylene carbonates, more than 85% and preferably more than 90% of all linkages are carbonate groups. Suitable zinc and cobalt catalysts are described in U.S. Pat. No. 4,789,727 and U.S. Pat. No. 7,304,172. Polypropylene carbonate is further obtainable similarly to Soga et al., Polymer Journal, 1981, 13, 407-10. The polymer is also commercially available, for example from Empower Materials Inc. or Aldrich.

At workup, it is particularly important that the catalyst be removed as quantitatively as possible. For this, the general practice is to dilute the reaction mixture with a polar aprotic solvent such as for example a carboxylic ester (particularly ethyl acetate), a ketone (particularly acetone), and ether (particularly tetrahydrofuran) to 2 to 10 times the volume. Subsequently, the reaction mixture is admixed with an acid such as acetic acid and/or an acid anhydride such as an acetic anhydride and stirred for several hours at slightly elevated temperature. The organic phase is washed and separated. The solvent is preferably distilled off under reduced pressure and the residue dried.

The molecular weight Mn of the polypropylene carbonates prepared by following the processes mentioned above is generally in the range from 70 000 to 90 000 Da. The molecular weight Mw is typically in the range from 250 000 to 400 000 Da. The ratio of the ether to carbonate groups in the polymer is 5:100 to 90:100. For improved performance characteristics it can be advantageous to treat the polyalkylene carbonates with MA, acetic anhydride, di- or polyisocyanates, di- or polyoxazolines or -oxazines or di- or polyepoxides. Polypropylene carbonates having a molecular weight Mn in the range from 30 000 to 5 000 000, preferably 35 000 to 250 000 and more preferably in the range from 40 000 to 150 000 Da are obtainable in this way. Polypropylene carbonates with Mn below 25 000 Da typically have low glass transition temperatures below 25° C. In addition, these molding materials have an ISO 527-2/DIN 53455 modulus of elasticity of less than 400 MPa and a stress to break of less than 10 MPa. These low molecular weight polypropylene carbonates have no utility for most film applications. Polydispersity (ratio of weight average (Mw) to number average (Mn)) is generally between 1 and 80 and preferably between 2 and 10. The polypropylene carbonates used may comprise up to 1% of carbamate and urea groups.

Useful chain extenders for the polyalkylene carbonates are particularly MA, acetic anhydride, di- or polyisocyanates, di- or polyoxazolines or -oxazines or di- or polyepoxides. Examples of isocyanates are tolylene 2,4-diisocyanate, tolylene 2,6-diisocyanate, 2,2'-diphenylmethane diisocyanate, 2,4'-diphenylmethane diisocyanate, 4,4'-diphenylmethane diisocyanate, naphthylene 1,5-diisocyanate or xylylene diisocyanate and particularly 1,6-hexamethylene diisocyanate, isophorone diisocyanate or methylenebis(4-isocyanatocyclohexane). Particularly preferred aliphatic diisocyanates are isophorone diisocyanate and particularly 1,6-hexamethylene diisocyanate. As bisoxazolines there may be mentioned 2,2'-bis(2-oxazoline), bis(2-oxazolinyl)methane, 1,2-bis(2-oxazolinyl)ethane, 1,3-bis(2-oxazolinyl)propane or 1,4-bis(2-oxazolinyl)butane, particularly 1,4-bis(2-oxazolinyl)benzene, 1,2-bis(2-oxazolinyl)benzene or 1,3-bis (2-oxazolinyl)benzene. The chain extenders are preferably used in amounts of 0.01% to 5%, preferably 0.05% to 2% and more preferably 0.08% to 1% by weight, based on the amount of polymer.

Components iii comprise one or more biodegradable homo- or copolyesters selected from the group consisting of polylactic acid, polycaprolactone and polyhydroxyalkanoate, and/or an inorganic or organic filler. Preferred components iii are polylactic acid (PLA) and polyhydroxyalkanoates particularly polyhydroxybutyrate (PHB) and polyhydroxybutyrate-co-valerate (PHBV) and also as organic fillers: native or plasticized starch, wood flour or natural fibers such as sisal, cellulose and/or inorganic fillers such as: chalk, graphite, gypsum, conductivity grade carbon black, iron oxide, calcium chloride, dolomite, kaolin, silicon dioxide, sodium carbonate, titanium dioxide, silicate, wollastonite, mica, montmorillonite, and more particularly talcum, glass fibers and mineral fibers.

Polylactic acid (component iii) having the following profile of properties is preferably used:
 an ISO 1133 MVR melt volume rate at 190° C. and 2.16 kg of 0.5—preferably 2—to 30 particularly 9 ml/10 minutes
 a melting point below 240° C.;
 a glass transition point Tg above 55° C.
 a water content of less than 1000 ppm
 a residual monomer content (lactide) of less than 0.3%
 a molecular weight of greater than 80 000 daltons.
Preferred polylactic acids are for example NatureWorks® 4020 or 4042D (polylactic acid from NatureWorks).

Polyhydroxyalkanoates are primarily poly-4-hydroxybutyrates and poly-3-hydroxybutyrates, but further comprise copolyesters of the aforementioned hydroxybutyrates with 3-hydroxyvalerates or 3-hydroxyhexanoate. Poly-3-hydroxybutyrate-co-4-hydroxybutyrates are known from Metabolix in particular. They are marketed under the trade name of Mirel®. Poly-3-hydroxybutyrate-co-3-hydroxyhexanoates are known from P&G or Kaneka. Poly-3-hydroxybutyrates are marketed for example by PHB Industrial under the trade name of Biocycle® and by Tianan under the name of Enmat®.

The molecular weight Mw of the polyhydroxyalkanoates is generally in the range from 100 000 to 1 000 000 and preferably in the range from 300 000 to 600 000.

Polycaprolactone is marketed by Daicel under the product name of Placcel®.

One preferred embodiment comprises selecting 1% to 60% by weight and preferably 5% to 40% by weight, based on the total weight of components i to iii, of an organic filler selected from the group consisting of native or plasticized starch, natural fibers, wood meal, comminuted cork, ground bark, nut shells, ground presscakes (vegetable oil refining), dried production residues from the fermentation or distillation of beverages such as, for example, beer, brewed lemonades (for example Bionade), wine or sake and/or an inorganic filler selected from the group consisting of chalk, graphite, gypsum, conductivity carbon black, iron oxide, calcium chloride, dolomite, kaolin, silicon dioxide (quartz), sodium carbonate, titanium dioxide, silicate, wollastonite, mica, montmorillonites, talcum, glass fibers and mineral fibers.

Starch and amylose may be native, i.e., non-thermoplasticized, or they may be thermoplasticized with plasticizers such as glycerol or sorbitol for example (EP-A 539 541, EP-A 575 349, EP 652 910).

Examples of natural fibers are cellulose fibers, hemp fibers, sisal, kenaf, jute, flax, abacca, coir fiber or Cordenka fibers.

Preferred fibrous fillers are glass fibers, carbon fibers, aramid fibers, potassium titanate fibers and natural fibers, of which glass fibers in the form of E-glass are particularly preferred. These can be used as rovings or particularly as chopped glass in the commercially available forms. The diameter of these fibers is generally in the range from 3 to 30 µm, preferably in the range from 6 to 20 µm and more preferably in the range from 8 to 15 µm. The fiber length in the compound is generally in the range from 20 µm to 1000 µm, preferably in the range from 180 to 500 µm and more preferably in the range from 200 to 400 µm.

Component iv comprises particularly epoxy-containing copolymer based on styrene, acrylic ester and/or methacrylic ester. The units which bear epoxy groups are preferably glycidyl(meth)acrylates. Copolymers having a glycidyl methacrylate content of greater than 20%, more preferably greater than 30% and even more preferably greater than 50% by weight of the copolymer will be found particularly advantageous. The epoxy equivalent weight (EEW) in these polymers is preferably in the range from 150 to 3000 and more preferably in the range from 200 to 500 g/equivalent. The weight average molecular weight $M_W$ of the polymers is preferably in the range from 2000 to 25 000 and particularly in the range from 3000 to 8000. The number average molecular weight $M_n$ of the polymers is preferably in the range from 400 to 6000 and particularly in the range from 1000 to 4000. The polydispersity (Q) is generally between 1.5 and 5. Epoxy-containing copolymers of the abovementioned type are commercially available, for example from BASF Resins B.V. under the Joncryl® ADR brand. Joncryl® ADR 4368 is particularly useful as chain extender.

Component iv) is generally used in an amount of 0% to 10% by weight, preferably 0.1% to 5% by weight and more preferably 0.5% to 2% by weight, based on the total weight of components i) to iii).

The biodegradable polyester mixtures of the present invention may comprise further additives (component v) which are known to a person skilled in the art which are not essential to the present invention. Examples are the materials customarily added in plastics technology such as stabilizers; nucleating agents; neutralizing agents; lubricating and release agents such as stearates (particularly calcium stearate); plasticizers such as for example citric esters (particularly tributyl acetylcitrate), glyeric esters such as triacetylglycerol or ethylene glycol derivatives, surfactants such as polysorbates, palmitates or laurates; waxes such as for example beeswax or beeswax ester; antistat, UV absorber; UV stabilizer; thermal stabilizers; antifog agent; dyes; color pigments or actives (for example crop protection agents such as fungicides, insecticides, biocides, growth promoters, pheromones and vitamins). Useful additives further include epoxy-containing (epoxidized) natural oils or fatty acid esters. By natural oils are meant for example olive oil, linseed oil, soybean oil, palm kernel oil, groundnut oil, coconut oil, seaweed oil, cod liver oil or a mixture thereof. Particular preference is given to epoxidized soybean oil (for example Merginat® ESBO from Hobum, Hamburg, or Edenol® B 316 from Cognis, Düsseldorf). The additives are used in concentrations of 0% to 15% by weight and particularly 0.1% to 2% by weight, based on the polyesters of the present invention. Plasticizers can be present in the polyesters of the present invention at 0.1% to 10% by weight.

Typical polymer mixtures comprise:

The biodegradable polyester mixtures of the present invention comprise, typically, from 40% to 95% by weight, preferably from 40% to 80% by weight and more preferably from 40% to 60% by weight of component i and from 5% to 60% by weight, preferably from 20% to 60% by weight and more preferably from 40% to 60% by weight of component ii, the weight percentages each being based on the aggregate weight of components i to ii and adding up to 100% by weight.

The production of extruded thermoplastics such as films for example requires bubble stability. It has now been found that mixtures in which component i forms a preferably continuous phase or at least cocontinuous phase and component ii is embedded in separate regions into this phase have bubble stability. In order that component i may form a continuous phase, the mixtures include in general more than 40% by weight and preferably more than 50% by weight of component i, all based on the aggregate weight of components i and ii The production of moldings by injection molding for example may utilize polyester mixtures of high polyhydroxybutyrate (PHB) or particularly polylactic acid (PLA) content (component iii). Polylactic acid in particular but also, to some extent, polyhydroxyalkanoates form a cocontinuous phase with polypropylene carbonate between wide limits.

Preferred embodiments of polymer mixtures of the present invention comprise:

20% to 80% by weight, more preferably 40% to 60% by weight, based on the aggregate weight of components i to ii, of component i; and 80% to 20% by weight, more preferably 60% to 40% by weight, based on the aggregate weight of components i to ii, of a mixture consisting of:

20% to 80% by weight of polypropylene carbonate; and

80% to 20% by weight of polyhydroxyalkanoate and particularly polylactic acid.

The "biodegradable" feature shall for the purposes of the present invention be considered satisfied for any one material or composition of matter when this material or composition of matter has a DIN EN 13432 percentage degree of biodegradation equal to at least 90%.

The general effect of biodegradability is that the polyester (blends) decompose within an appropriate and verifiable interval. Degradation may be effected enzymatically, hydrolytically, oxidatively and/or through action of electromagnetic radiation, for example UV radiation, and may be predominantly due to the action of microorganisms such as bacteria, yeasts, fungi and algae. Biodegradability can be quantified, for example, by polyesters being mixed with compost and stored for a certain time. According to DIN EN 13432, for example, $CO_2$-free air is flowed through ripened compost during composting and the ripened compost subjected to a defined temperature program. Biodegradability here is defined via the ratio of the net $CO_2$ released by the sample (after deduction of the $CO_2$ released by the compost without sample) to the maximum amount of $CO_2$ releasable by the sample (reckoned from the carbon content of the sample), as a percentage degree of biodegradation. Biodegradable polyesters/polyester blends typically show clear signs of degradation, such as fungal growth, cracking and holing, after just a few days of composting.

Other methods of determining biodegradability are described in ASTM D 5338 and ASTM D 6400-4 for example.

The production of the biodegradable polymer mixtures of the present invention from their individual components can be effected by following known processes (EP 792 309 and U.S. Pat. No. 5,883,199). For example, all mixing partners can be mixed and reacted in one operation in conventional mixing devices, for example kneaders or extruders at elevated temperatures, for example in the range from 120° C. to 250° C.

For example, all components i, ii and iii can be mixed and reacted in one operation in conventional mixing devices, for example kneaders or extruders at elevated temperatures, for example in the range from 120° C. to 250° C.

It may in addition be advantageous for components i and ii to be initially mixed and subsequently admixed/reacted with a mixture of components iii and iv.

Similarly, it will be found advantageous in the case of ternary mixtures formed from the components i to iii for components ii and iii to be premixed and admixed with a mixture of component i, if appropriate component iv and if appropriate component v.

For this, in a first step, 1% to 50% by weight and preferably 5-35% by weight of component iv is mixed with 50% to 99% by weight and preferably 65% to 95% of component i at temperatures of 110 to 145° C.—preferably 120 to 140° C.—to give a branching agent masterbatch. At these temperatures, a homogeneous blend is obtained, without significant molecular weight increase. The branching agent masterbatch thus obtained can be stored at room temperature without difficulty. In a second step, the desired composition can be established by addition of the branching agent masterbatch to components ii and iii and, if appropriate, further component i. This compounding step is carried out at 150 to 250° C., preferably at 160 to 190° C.

The biodegradable polyester mixtures of the present invention are particularly useful in the production of moldings, films or fibers. Production can be effected by following methods known to a person skilled in the art.

One particular field of use for the biodegradable polyester mixtures with improved degradation rates concerns the use in the production of films, particularly mulch films for agriculture. Such mulch films are applied to agricultural areas to protect and growth accelerate mostly young seedlings. After harvest, these mulch films are left on the field or—in the case of biodegradable mulch films—plowed under. Substantial biodegradation of these mulch films has to occur by the start of sowing in the following year.

The polymer mixtures of the present invention are very useful for foam applications (see EP 07102477.2 and EP 07102497.0; "foam extrusion—principles and practice", Shau-Tarng Lee, 376 pages, CRC Press, 2000; "thermoplastic foam extrusion", James Thorne, Carl Hanser, 2006). The following advantages result:

Translucent, highly light-transmissive foamed materials
Soft touch—even in coextruded form
Biodegradability to DIN EN 13432
Interesting haptics
Suitable for food packaging
High UV resistance
Low density
Good acoustical insulation
Good barrier properties.

The foams are useful as trays, containers for meat, fish, fruit, vegetables, seafood, fast food products; as protective skin for products having a sensitive surface, such as consumer goods, automobiles, electricals, hi-fi sets, telephones, cellphones; packaging materials, inserts and cleaning sponges.

The polymer mixtures of the present invention can be processed into foam plies or else bead foams of low density. Foams having a density distinctly below 150 g/L are realizable for example with a binary mixture of 59% by weight of aliphatic-aromatic polyester (Ecoflex® FBX 7011) and 40% by weight of polypropylene carbonate (see Example 1). Pure polypropylene carbonate can similarly be foamed, but has a higher density. It is advantageous to add 0.02% to 5% and preferably 0.1% to 2% by weight of a nucleating agent to the polymer mixture before foaming. Useful nucleating agents include particularly talcum, chalk, carbon black or other mineral fillers. Useful blowing agents include particularly physical blowing agents such as nitrogen, butane, pentane and particularly carbon dioxide. During foaming, the blowing agent is generally subjected to a pressure of up to 400 atmosphere. Foaming can take place not only in an extrusion process but also in an injection molding process. Similarly, in situ foaming on a film will prove advantageous. Foaming temperatures generally range from 30 to 240° C. and preferably from 40 to 100° C. The foams are homogeneous microcellular structures and generally include closed and open cells. The closed cell content can be distinctly increased by addition of component iv) such as for example Joncryl ADR 4368. For acoustical absorption, it can be advantageous to increase the proportion of open-cell structures.

The polymer mixtures of the present invention are very useful for transparent, rigid or semi-rigid packaging, elements, containers, etc as disclosed in: "Polymer Extrusion", Chris Rauwendaal, Carl Hanser, 1986; "Thermoforming", James Thorne, Carl Hanser, 1986; "Einführung in die Kunststoffverarbeitung", Walter Michaeli, Carl Hanser, 2006; "Handbuch Spritzgießen", Friedrich Johannaber, W. Michaeli, Carl Hanser, 2004; "Blow Molding Handbook", Dominik V. Rosato et al., Carl Hanser, 2004; "Kunststoff Maschinenführer", Friedrich Johannaber, Carl Hanser, 2004. To be recited here are particularly cups, pots, lids, dishes, trays, drinking straws in the catering, fast food sector. Transparent packaging for dairy, transparent, semi-rigid packaging for sausages and meat, cheese, fish, fruit and vegetables, tablets and pharmaceuticals.

The polymer mixtures of the present invention are very readily further processible into tubular film, stretch wrapping film, peelable film and shrink wrapping film. Possible applications here are bottom gusset bags, side seam bags, grip hole carrier bags, shrink labels or vest type carrier bags.

Shrink wrapping films have a shrinkage rate of more than 40%, preferably more than 50% and more preferably more than 60% in the extrusion direction of the shrink wrapping film. In the perpendicular direction, the shrink wrapping film has comparatively low shrinkage values of less than 40%, preferably less than 25% and more preferably less than 15%. The shrinkage values relate to the film being heated to at least 10° C. and preferably at least 30° C. above its glass transition temperature in the shrinkage duct. It is particularly preferable to heat the film to at least 50° C. (preferably at least 30° C.) below the melting temperature of the film material so that the film can also be welded as it shrinks.

Shrink wrapping films or shrink labels are currently often used to endow bottles or other receptacles with printable information. Examples thereof are full body sleeves, shrink sleeves, promotion packs, safety closures and so on, as described for example in "Kunststoff-Folien Herstellung-Eigenschaften-Anwendung", Joachim Nentwig, Carl Hanser, 2001.

This process converts the mixtures of the present invention into the following products for example: films for hygiene applications: for example diaper backsheets, feminine care products, fruit and vegetable bags, newspaper wrapping films, carrier bags, shopping bags, composting bags, garbage bags, peelable closure film—transparent or opaque—weldable closure film—transparent or opaque, sausage casing, salad film, keep-fresh film (stretch wrapping film) for fruit and vegetables, meat and fish, stretch wrapping film for wrapping pallets, film for nets, packaging films for snacks, confectionery bars and muesli bars, peelable lid films for dairy packaging (yogurt, cream, etc.), fruit and vegetables, semi-rigid packaging for smoked sausage and for cheese.

The biodegradable polyester mixtures of the present invention provide biodegradable polymer mixtures that process without bubble stability problems into puncture-resistant films.

A comprehensive overview of packaging technology is to be found in: "Food Packaging Technology", Richard Coles, Derek McDowell, Mark Blackwell Publishing, CNC Press, 2003 and "Wursthüllen Kunstdarm-Herstellung-Eigenschaften-Anwendung", Gerhard Effenberger, Holzmann Verlag, 1991. Examples of products obtainable from the mixtures of the present invention are protective gas packs, transparent release films, films capable of being cooked and sterilized, and metal-free release films.

The mixtures of the present invention have excellent oxygen and aroma barrier properties for biodegradable films and so are predestined for packaging of meat, poultry, meat products, processed meat, small sausages, smoked sausage, seafood, fish, crab meat, cheese, cheese products, desserts, pies for example with meat, fish, poultry, tomato filling, pastes and bread spreads; bread, cake, other baked goods; fruit, fruit juices, vegetables, tomato paste, salads; pet food; pharmaceutical products; coffee, coffee-like products; milk or cocoa powder, coffee whitener, baby food; dried foods; jams and jellies; bread spreads, chocolate cream spread; readymade meals. Further information see reference in "Food Processing Handbook", James G. Brennan, Wiley-VCH, 2005.

The mixtures are also useful as materials of construction for hygiene products such as toothbrushes, combs, Q-tips, lipsticks or brushes, extruded hoses in the form of garden hoses, two- and three-dimensional works of art, etc.

Owing to their interesting haptic properties, the mixtures of the present invention can be used for footwear, for example as soles or inserts, as inserts for ski boots, as kneepads, shoulder pieces, brassiere inserts or other sports, cosmetics or medical products.

The mixtures can also be formed into fibers, by spinning for example, and used in the production of garments, bed sheets or blankets.

The mixtures are also very readily further processible into wood plastic composites (WPCs).

WPCs (also known as wood(-fiber) polymer composites) are thermoplastically processible composite materials of construction which consist of different proportions of wood, plastics and additives and are processed via thermoplastic shaping processes, for example extrusion, injection molding, rotomolding, compression molding or thermoforming. Above a fiber content of 20 percent they are classed as biobased. Advantages of wood plastic composites over wood-base materials are the free, 3-dimensional shapeability of the wood plastic composite and its greater resistance to moisture. Compared with wholly plastics materials, WPCs offer higher stiffness and a distinctly lower thermal expansion coefficient.

The most important market for WPCs is deckings, where biobased currently holds a market share of about 6%—particularly as a substitute for tropical woods. A future market share of 20% is considered possible. There has been a distinct increase in applications in the furniture industry (furniture profiles, floor strips), where several WPC chair and shelf systems are available inter alia.

The European automotive industry uses about 50 000 t of WPC per annum as door inner trim and parcel shelves (later enclosed in trim). Thermoplastic injection-molded articles manufactured from biobased WPC are hitherto on offer in Germany only as "niche products" (Wikipedia).

Using wood flour and natural fibers makes it possible to still further increase the heat resistance of PPC (Tg 25-35° C.) and mixtures thereof, so that new fields of use can be opened up for PPC.

Polymer mixtures of PPC with starch, natural fibers and wood flour are already described in the literature in Polym Rev. 2008, 192-219. In general, Young's modulus increases with increasing filler content, while breaking extension decreases distinctly even at low filling levels.

EXAMPLES

Performance-Related Measurements

The molecular weight Mn of partly aromatic polyesters was determined as follows:

15 mg of each partly aromatic polyester were dissolved in 10 ml of hexafluoroisopropanol (HFIP). In each case, 125 µl of this solution were analyzed by means of gel permeation chromatography (GPC). The measurements were carried out at room temperature. HFIP+0.05% by weight of potassium trifluoroacetate was used for elution. The elution rate was 0.5 ml/min. The column combination used was as follows (all columns from Showa Denko Ltd., Japan): Shodex® HFIP-800P (diameter 8 mm, length 5 cm), Shodex® HFIP-803 (diameter 8 mm, length 30 cm), Shodex® HFIP-803 (diameter 8 mm, length 30 cm). The partly aromatic polyesters were detected by means of an RI detector (differential refractometry). Narrowly distributed polymethyl methacrylate standards having molecular weights of $M_n$=505 to $M_n$=2 740 000 were used for calibration. Elution ranges outside this interval were determined by extrapolation.

Permeation Measurements

Water Vapor

Water vapor transmission rates at 85% relative humidity were measured using a MOCON PERMATRAN-W® 3/33, the principle of operation of which is based on the carrier gas method.

In the carrier gas method, the free sample films (without support material) are installed within the area of 5 cm² in this case in an airtight cell having an empty chamber on each side. A carrier gas ($N_2$) is routed past one side of the sample and the measuring gas ($N_2$+water vapor) past the other side, at atmospheric pressure. The measuring gas diffusing through the sample is taken up by the carrier gas and is routed to a selective sensor. An IR sensor is used in the case of water vapor measuring instruments. Water vapor concentration can thus be determined as a function of time.

The measurements are carried out at 23° C. in accordance with ASTM F-1249. The instrument is conditioned for about half an hour. The transmission rate through the sample is measured with the relative humidity set to 85% as accurately as possible, the small experimental error involved in setting the humidity is subsequently corrected arithmetically on the assumption that the transmission rate correlates linearly with the relative humidity in the range measured.

Machine run time for measurements was one day.

Oxygen

The dry oxygen transmission rates were measured with a MOCON OX-TRAN® 2/21, the principle of operation of which is likewise based on the carrier gas method.

In the carrier gas method, the free sample films (without support material) are installed within the area of 5 cm² in this case in an airtight cell having an empty chamber on each side. A carrier gas (95% $N_2$ and 5% $H_2$) is routed past one side of the sample and the measuring gas (100% dry $O_2$) past the other side, at atmospheric pressure. The measuring gas diffusing through the sample is taken up by the carrier gas and is routed to a selective sensor. The oxygen concentration can thus be determined as a function of time.

An electrochemical detector is used in the case of oxygen measuring instruments. The measurements are carried out at 23° C. The instrument operates to ASTM D-3985. The conditioning of the instrument takes about half an hour.

Machine run time was one day for all measurements.

Data Processing

For both methods of measurement, the transmission rate [g/m²/day] of the sample is standardized to the average thickness of the sample, measured in 5 different places, to give the permeation rate [g·m/m²/day/bar]. The data and results are given in the table which follows.

Materials Used:

Component i:

i-1: Ecoflex® FBX 7011, manufactured by BASF SE

Component ii:

ii-1: Polypropylene carbonate a. Catalyst Preparation

A 1 l four neck flask equipped with stirrer, heating bath and a water trap was initially charged with 35 g of ground zinc oxide in 250 ml of absolute toluene. After 53 g of glutaric acid was added, the mixture was heated to 55° C. for 2 hours with stirring. Thereafter, it was heated to the boil with the water of reaction being distilled off azeotropically under reflux until water stopped passing over. The toluene was distilled off and the residue was dried at 80° C. under high vacuum.

b. Polymerization 12 g of zinc glutarate were initially charged to the reactor. A 3.5 l autoclave equipped with mechanical stirrer was used. After the reactor was sealed it was repeatedly purged with $N_2$ gas. Then, 620 g of toluene were added and 6 bar of $CO_2$ were injected into the reactor at room temperature (23° C.). Subsequently, 310 g of propylene oxide were injected into the reactor, followed by heating to 80° C. Thereafter, sufficient $CO_2$ was injected into the reactor at 80° C. to establish a $CO_2$ pressure of 40 bar. The reactor was maintained at 80° C. for 4 h during which no further $CO_2$ was added. This was followed by cooling down to room temperature.

c. Workup

The reactor was opened to the air and the reactor contents were poured into 1 l of ethyl acetate acidified with 65% by weight of concentrated acetic acid, based on the amount of polymer, and 2% by weight of acetic anhydride, based on the acetic acid. This was followed by stirring at 40° C. for 2 h. The organic phase was then washed three times with 1 liter of water. The solvent was expelled from the organic phase and the polymer residue was dried under reduced pressure.

d. Analysis

To determine the proportion of unwanted by-products (cyclic propylene carbonate and the polyether fraction in the polymer backbone), $^1$H NMR spectra were recorded on an AMX 300 spectrometer from Bruker. The polyether fraction was 4.2% and the fraction of cyclic carbonate in relation to the total amount of carbonate was about 2.0%.

The molecular weight ($M_n$ and $M_w$) of the polymer was also measured: $M_n$ 52 000 g/mol, $M_w$ 910 000 g/mol.

Component iii:

iii-1: NatureWorks® 4020 polylactic acid from NatureWorks

Component iv:

iv-1: Joncryl® ADR 4368 from BASF B.V.

Further Components:

Additive: erucamide (Cognis GmbH, D-Düsseldorf), ethylenebisstearylamide, calcium carbonate (Omya BLS, OMYA GmbH, D-Cologne)

The masterbatches used were:— v-1: FBA-SL1 batch with
   73% of component i-1,
   20% of component iv-1,
   7% of erucamide (Cognis GmbH, D-Dusseldorf)

v-2: SL 1 batch with
   90% of component i-1,
   10% of erucamide (Cognis GmbH, D-Dusseldorf)

v-3: AB 1 batch with
   40% of component 1-1,
   60% of calcium carbonate (Omya BLS, OMYA GmbH, D-Cologne)

Compounding

Components i-1 and iii-1 were predried to less than 800 ppm residual moisture content in a circulating air thermal cabinet at 60° C. Component ii-1 was stored and predried at temperatures below 30° C. on account of the low Tg.

Components i-1, ii-1 and iii-1 and v-1 were predried at 60° C. to less than 800 ppm residual moisture content. The components were premixed with dry ice to prevent a temperature increase to above 30° C.

The compounds were subsequently produced on a ZSK 25 from Coperion, D-Stuttgart, at 300 1/min and a melt temperature of 190° C. Throughput is 10 kg/h. The extrudates were cooled down to about 15° C. in a water bath and pelletized with a strand pelletizer.

| Example | Component i-1 [% by weight] | Component ii-1 [% by weight] | Component iii-1 [% by weight] | Component v-1 [% by weight] |
|---|---|---|---|---|
| 1 | 59 | 40 | | 1 |
| 2 | 49 | 40 | 10 | 1 |
| 3 | 54 | 13 | 32 | 1 |
| 4 | 41 | 13 | 45 | 1 |
| V1 | 97 | | | 1 + 2 comp. v-iii |
| V2 | 54 | | 45 | 1 |
| V3 | 67 | | 32 | 1 |

Film Production

The films were produced on a tubular film range. The extruder (45 mm diameter, 25 D length) was operated with a grooved feed zone and a three-zone screw having shearing and mixing portions. The feed zone was cooled with cold water at less than 10° C. at maximum throughput. Zone temperatures were chosen such that the melt temperature was between 180° C. and 190° C. Die temperatures were in the region of the melt temperature. Die diameter was 75 mm, slot size was 1.2 mm. The rotary speed and the chosen throughput of 10 kg/h was 300 1/min. The expansion ratio of 3.5:1 produced a lay flat width of 412 mm for the film tube. Takeoff speed was 2.7 m/min for a film thickness of 30 μm.

The components were dry mixed before film production to produce a dry blend in the case of the V1 run only. The other products were processed into films without pretreatment. The abovementioned examples gave the films F1, F2, F3, F4, F-V1, F-V2 and F-V3.

The excellent increase in stiffness, stress at yield and puncture resistance resulted in only a minimal reduction in breaking extension in the CD direction. Tensile strengths rose slightly in MD and only decreased minimally in CD.

The permeation values for oxygen and water vapor drop to respectively ⅙ and ⅓ of the original value for the same film thickness.

The transparency of the films (haze value) improves by more than 50%.

TABLE 1

Comparison of film results

| Tests | Unit | Method | F1 | F2 | F3 | F4 | F-V1 | F-V2 | F-V3 |
|---|---|---|---|---|---|---|---|---|---|
| Film thickness (mean value) | μm | film | 30 | 30 | 30 | 30 | 30 | 30 | 30 |
| Tensile E modulus | along | ISO 527 | | | | | | | |
| E modulus | Mpa | " | 610 | 907 | 1058 | 1509 | 108 | 788 | 1296 |
| Stress at yield | Mpa | " | 17.9 | 22.9 | 27.0 | 38.0 | 9.7 | 21.9 | 33.9 |
| Strain at yield | % | " | 3.0 | 2.9 | 3.3 | 3.0 | 20.3 | 5.2 | 3.2 |
| Tensile strength | MPa | " | 38.6 | 37.4 | 33.7 | 41.3 | 35.3 | 29.5 | 34.4 |
| Strain/F - max | % | " | 679 | 464 | 223 | 149 | 634 | 251 | 97 |
| Breaking strength | MPa | " | 38.4 | 37.2 | 33.5 | 41.1 | 34.8 | 29.4 | 32.0 |
| Breaking extension | % | " | 681 | 466 | 224 | 224 | 640 | 253 | 206 |
| Tensile E modulus | across | ISO 527 | | | | | | | |
| E modulus | Mpa | " | 441 | 775 | 643 | 1203 | 102 | 414 | 703 |
| Stress at yield | Mpa | " | 14.6 | 19.8 | — | 27.2 | 9.1 | — | — |
| Strain at yield | % | " | 4.7 | 3.6 | — | 4.0 | 18.7 | — | — |
| Tensile strength | MPa | " | 38.7 | 35.9 | 33.6 | 34.2 | 39.5 | 30.6 | 29.7 |
| Strain/F - max | % | " | 614 | 434 | 274 | 137 | 749 | 310 | 217 |
| Breaking strength | MPa | " | 38.5 | 35.6 | 33.4 | 34.0 | 39.1 | 30.4 | 29.5 |
| Breaking extension | % | " | 616 | 437 | 275 | 153 | 753 | 312 | 220 |
| Puncture resistance | | DIN 53373 | | | | | | | |
| Film thickness (mean value) | μm | film | 29 | 29 | 29 | 28 | 32 | 31 | 31 |
| W fracture | N/mm | " | 53.3 | 52.5 | 27.4 | 23.3 | 26.0 | 27.6 | 39.3 |
| Permeation | | film | — | — | | | | | |
| $O_2$ | $cm^3/m^2/d$ | ASTM D 3985 | 320 | 267 | | | 2015 | 2320 | 1835 |
| $O_2$ | $cm^3 \times 1\,\mu m/m^2/d/bar$ | ASTM D 3985 | 9585 | 8685 | | | 58250 | 70150 | 58550 |
| $H_2O$ | $g/m^2/d$ | ASTM F 1249 | 72.8 | 63 | | | 249.5 | 167.5 | 119 |
| $H_2O$ | $g \times 1\,\mu m/m^2/d$ | ASTM F 1249 | 2155 | 2020 | | | 6850 | 4990 | 3745 |
| Transparency | | ASTM D 1033 | | | | | | | |
| Transmission | % | " | 86.80 | 85.43 | 84.03 | 82.33 | 90.50 | 84.93 | 79.83 |
| Haze | % | " | 29.03 | 51.53 | 89.93 | 78.87 | 65.23 | 91.10 | 73.87 |
| Clarity | % | " | 58.27 | 34.40 | 8.87 | 12.43 | 80.80 | 8.60 | 22.77 |
| Thermal cabinet shrinkage | along | | — | — | — | — | — | — | — |
| Shrinkage at 150° C./10 min | % | | 34.9 | 35.7 | | | 10.7 | | |
| Thermal cabinet shrinkage | across | | — | — | — | — | — | — | — |
| Shrinkage at 150° C./10 min | % | | 20.3 | 24.2 | | | 0.6 | | |

Comparison of Films F1 and F-V1 (See Table 1)

The mechanical parameters of the F1 film are improved as follows by the additional fraction of inventive component ii-1 compared with F-V1 (MD=machine direction; CD=cross direction):

| F1 compared with F-V1 see table 1 | MD [%] | CD [%] |
|---|---|---|
| Mechanicals | | |
| Stiffness (E modulus) | +465 | +332 |
| Stress at yield | +85 | +60 |
| Tensile strength | +9 | −2 |
| Breaking extension | +6 | −18 |
| Puncture resistance | +105 | |
| Permeation | | |
| Oxygen | −84 | |
| Water vapor | −68 | |
| Haze | −55 | |
| Schrinkage (150° C., 10 min.) | +226 | +2000 |

Shrinkage values are significantly increased in both directions.

These results are surprising since component ii-1 is present in fine dispersion in component i-1 and does not form the continuous phase.

Comparison of Films F4 and F-V2 (See Table 1)

The F1 film differs in composition from the F-V2 comparative film in that 13% of component i-1 was replaced by component ii-1. The profile of properties changes as follows:

| F1 compared with F-V1 see table 1 | MD [%] | CD [%] |
|---|---|---|
| Mechanicals | | |
| Stiffness (E modulus) | +91 | +190 |
| Stress at yield | +78 | — |
| Tensile strength | +40 | +12 |
| Breaking extension | −11 | −51 |
| Puncture resistance | −16 | |
| Haze | −14 | |

The inventive F4 film shows a distinct increase in stiffness and strength compared with F-V2. Breaking extension decreases as expected for the stiffer film F4 and puncture resistance is reduced.

The improved transparency indicates a structural change compared with F-V2. Transmission electron micrographs show that it is now component ii-1 which forms the coherent phase.

Wood Plastic Composites (WPCs)

EXAMPLES

Production of Blends on Roll Mill

The rollers of the roll mill are heated to 180° C. and PPC, Ecoflex and polylactide or the polymer mixtures of Examples 1 and 2 are mixed with wood flour for at least 20 minutes until a homogeneous sheet is formed:
The following admixtures were chosen as examples:

Example 5

50 g of Example 1 Compound and 50 g of Sprucewood Flour

Example 6

50 g of Example 2 Compound and 50 g of Sprucewood Flour

The milled sheet obtained in all cases was stiff, nontacky. The sheets were cut into smaller pieces (±50-100 mm²) and compression molded into different shapes for subsequent analytical purposes.
1. Vicat (ISO 306): round disks 1 cm² in size and 4 mm in thickness are molded.
2. HDT (ISO 75-1, -2): bars measuring 7×10×4 mm are molded.
3. E modulus (tensile test): compression-molded plates 60×60×1 mm in size are produced and then die cut to cut out shoulder bars 5 cm in length.

The molded articles obtained are stiff, nontacky.
2. Production of Blends on Extruder Polymer mixtures of PPC, Ecoflex, PLA and wood flour were produced using a DSM Mini Extruder with retraction. This was typically done using 11 g of polymer and mixing at 180° C. for 3-5 minutes. The polymer melt was injection molded into a shoulder bar mold and was subsequently easily demolded. The shoulder bars obtained are stiff, nontacky.
3. Heat Resistance

|  | Vicat (ISO 306) [° C.] | HDT ISO 75-1, -2 [° C.] |
| --- | --- | --- |
| Component ii-1 | <23 | not measurable |
| Example 1 | 63.9 | 36.6 |
| Example 2 | 50 | 40.5 |
| Example 5 | 99.1 | 71.6 |
| Example 6 | 107.4 | 86.3 |

The addition of sprucewood flour increases the heat resistance of the shoulder bars. For instance, adding 50% of sprucewood flour raises the heat resistance when measured in terms of heat deflection temperature to HDT ISO 75-1, −2 by 35° C. to 71.6° C. for Example 1. By adding 10% of PLA (Example 2) the heat deflection temperature can be raised to 86.3° C.

Mechanical Properties of Shoulder Bars

|  | E modulus [MPa] | Breaking stress [MPa] | Breaking extension [%] |
| --- | --- | --- | --- |
| Component ii-1 | 600 | 6 | 600 |
| Example 1 | 180 | 25 | 600 |
| Example 2 | 450 | 25 | 420 |
| Example 5 | 1580 | 17 | 2 |
| Example 6 | 2400 | 20 | 1 |

Adding sprucewood flour increases the stiffness of the material distinctly. For instance, the E modulus in Example 1 increases by 1400 MPa on addition of 50% of sprucewood flour. Adding 10% of PLA increases stiffness still further (2400 MPa).

By contrast, breaking extension decreases significantly on addition of natural fillers.

We claim:

1. A biodegradable polymer mixture comprising
   i) 40% to 95% by weight, based on the total weight of components i to ii, of at least one polyester based on aliphatic and aromatic dicarboxylic acids and aliphatic dihydroxy compounds;
   ii) 5% to 60% by weight, based on the total weight of said components i to ii, of polypropylene carbonate, wherein the polypropylene carbonate chain comprises more than 85% carbonate linkages and less than 15% ether linkages;
   iii) 0% to 60% by weight, based on the total weight of said components i to iii, of at least one biodegradable homo- or copolyester selected from the group consisting of polylactic acid, polycaprolactone and polyhydroxyalkanoate, and/or of an inorganic or organic filler;
   iv) 0% to 10% by weight, based on the total weight of said components i to ii, of an epoxy-containing copolymer based on styrene, acrylic ester and/or methacrylic ester, and
   v) 0% to 15% by weight of an additive;
   wherein said biodegradable polymer mixture is present in a shrink wrapping film.

2. The biodegradable polymer mixture according to claim 1 wherein said component i is constructed of:
   A) an acid component composed of
      a1) 30 to 99 mol % of at least one aliphatic dicarboxylic acid or its/their ester-forming derivatives or mixtures thereof,
      a2) 1 to 70 mol % of at least one aromatic dicarboxylic acid or its/their ester-forming derivative or mixtures thereof, and
      a3) 0 to 5 mol % of a sulfonated compound,
      the mole percentages of said components a1) to a3) together adding up to 100%, and
   B) a diol component composed of at least one $C_2$- to $C_{12}$-alkanediol or mixtures thereof
      and optionally also one or more components selected from
   C) a component selected from
      c1) at least one dihydroxy compound comprising ether functions and having the formula I $$HO-[(CH_2)_n-O]_m-H \qquad (I)$$

where n represents 2, 3 or 4 and m represents an integer from 2 to 250, c2) at least one hydroxy-carboxylic acid of the formula IIa or IIb

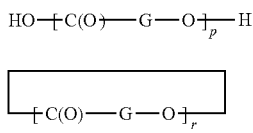

where p represents an integer from 1 to 1500 and r represents an integer from 1 to 4, and G represents a radical selected from the group consisting of phenylene, α-hydroxyphenylene, —$(CH_2)_q$—, where q is an integer from 1 to 5, —C(R)H— and —C(R)HCH$_2$, where R represents methyl or ethyl, c3) at least one amino-$C_2$- to $C_{12}$-alkanol or at least one amino-$C_5$- to $C_{10}$-cycloalkanol or mixtures thereof, c4) at least one diamino-$C_1$- to $C_8$-alkane, c5) at least one 2,2'-bisoxazoline of the general formula III

where $R^1$ represents a single bond, a $(CH_2)_z$ alkylene group, where z=2, 3 or 4, or a phenylene group, c6) at least one amino carboxylic acid selected from the group consisting of natural amino acids, polyamides obtainable by polycondensation of a dicarboxylic acid having 4 to 6 carbon atoms and a diamine having 4 to 10 carbon atoms, compounds of the formulae IV a and IVb

where s represents an integer from 1 to 1500 and t represents an integer from 1 to 4 and T represents a radical selected from the group consisting of phenylene, —$(CH_2)_u$—, where u represents an integer from 1 to 12, —C($R^2$)H— and —C($R^2$)HCH$_2$, where $R^2$ represents methyl or ethyl, and polyoxazolines comprising the repeat unit V

where $R^3$ represents hydrogen, $C_1$-$C_6$-alkyl, $C_5$-$C_8$-cycloalkyl, unsubstituted phenyl, phenyl substituted up to three times with $C_1$-$C_4$-alkyl groups or tetrahydrofuryl, or mixtures of c1) to c6)

and

D) a component selected from the group consisting of:

d1) a compound having at least three groups capable of ester formation, d2) a di- or polyisocyanate, d3) a di- or polyepoxide or mixtures of d1) to d3).

3. The biodegradable polymer mixture according to claim 2 wherein in said component i):

the aliphatic dicarboxylic acid (component a1)) comprises succinic acid, adipic acid or sebacic acid, their ester-forming derivatives or mixtures thereof;

the aromatic dicarboxylic acid (component a2)) comprises terephthalic acid or its ester-forming derivatives, and the diol component (component B) comprises 1,4-butanediol or 1,3-propanediol.

4. The biodegradable polymer mixture according to claim 1 wherein said component iii is polylactic acid and/or an organic filler selected from the group consisting of starch, wood flour and natural fibers.

5. The biodegradable polymer mixture according to claim 1 wherein the epoxy-containing copolymer in said component iv bears glycidyl ether groups.

6. The biodegradable polymer mixture according to claim 1 comprising

40% to 80% by weight of said component i and

60% to 20% by weight of said component ii, all based on the total weight of said components i to ii.

7. The biodegradable polymer mixture according to claim 6 comprising a) 40% to 60% by weight, based on the total weight of said components i to ii, of said component i;

b) 60% to 40% by weight, based on the total weight of said components i to ii, of a mixture consisting of:

20% to 80% by weight, based on component b), of polypropylene carbonate ii; and

80% to 20% by weight, based on component b), of polylactic acid or polyhydroxyalkanoate iii.

8. The biodegradable polymer mixture according to claim 6 wherein said component i forms a continuous or cocontinuous phase.

9. The biodegradable polymer mixture according to claim 6 wherein said components ii or said components ii and iii for a continuous or cocontinuous phase.

10. The biodegradable polymer mixture according to claim 1 comprising 0.1% to 5% by weight of said component iv, based on the total weight of said components i to ii.

11. A process for producing the biodegradable polymer mixture according to claim 1, which comprises said components i, ii and iii being mixed and reacted in one operation.

12. A process for producing the biodegradable polymer mixture according to claim 1, which comprises mixing said components i, ii in one operation and subsequently mixed and reacted with said components iii and iv.

13. A process to produce a molding, film or fiber which comprises utilizing the biodegradable polymer mixture according to claim 1.

14. The biodegradable polymer mixture according to claim 1, wherein said component ii is polypropylene carbonate, wherein the polypropylene carbonate chain comprises more than 90% carbonate linkages and less than 10% ether linkages.

* * * * *